United States Patent
Rajagopalan et al.

(10) Patent No.: US 12,402,010 B2
(45) Date of Patent: Aug. 26, 2025

(54) PROVIDING A SEAMLESS LOGIN EXPERIENCE IN A COMPANION MOBILE APPLICATION

(71) Applicant: Dell Products L.P., Round Rock, TX (US)

(72) Inventors: Vivekanandh Narayanasamy Rajagopalan, Bangalore (IN); Swagat Parida, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 533 days.

(21) Appl. No.: 18/051,703

(22) Filed: Nov. 1, 2022

(65) Prior Publication Data

US 2024/0147241 A1    May 2, 2024

(51) Int. Cl.
*H04W 12/63*  (2021.01)
*H04W 12/06*  (2021.01)

(52) U.S. Cl.
CPC ........... *H04W 12/63* (2021.01); *H04W 12/06* (2013.01)

(58) Field of Classification Search
CPC .... H04W 12/63; H04W 12/06; H04L 63/102; H04L 63/0807; H04L 63/0853; H04L 63/0876; H04L 63/0884; H04L 63/0892; H04L 63/18; H04L 9/321; H04L 9/3213; H04L 9/3215; H04L 9/3226; H04L 9/3228; H04L 9/3234
See application file for complete search history.

(56) References Cited

U.S. PATENT DOCUMENTS

| | | | |
|---|---|---|---|
| 2007/0032225 A1* | 2/2007 | Konicek | H04M 3/42 455/417 |
| 2021/0099868 A1* | 4/2021 | Damlaj | H04L 67/146 |

FOREIGN PATENT DOCUMENTS

CN    114845297 A  *  8/2022  ........... H04L 9/3213

* cited by examiner

*Primary Examiner* — Trong H Nguyen
(74) *Attorney, Agent, or Firm* — Kirton McConkie; Brian Tucker (57) ABSTRACT

A seamless login experience can be provided in a companion mobile application. When a user launches a mobile app on his mobile computing device, a login handler of the mobile app can establish a proximity channel with a user computing device on which the user is logged into a desktop application for which the mobile app is a companion application. The login handler can send a mobile user ID to a login plugin on the user computing device. If the mobile user ID matches a user ID used to log the user into the desktop application, the login plugin can provide a token to the login handler. The login handler can then use the token to obtain a session token that can be used to log the user into the mobile app.

20 Claims, 10 Drawing Sheets

PROVIDING A SEAMLESS LOGIN EXPERIENCE IN A COMPANION MOBILE APPLICATION

CROSS-REFERENCE TO RELATED APPLICATIONS

N/A

BACKGROUND

Users may have multiple channels to access their accounts with a provider. For example, the provider may have a website, a desktop application, and a mobile application that all provide a channel for accessing a user's account. If the provider is a provider of computing devices (e.g., Dell), the user's account could be used to track orders, subscriptions, warranty information, or other information about computing devices.

When multiple channels exist, it can be tedious for the user to access an account. For example, the user may be required to log in before gaining access to the account via a channel. If the user is already logged in and accessing the account via one channel (e.g., via a desktop application on a desktop or laptop computer), it can be frustrating to have to log in again to gain access to the account via another channel (e.g., via a mobile application on a smart phone).

BRIEF SUMMARY

The present invention extends to systems, methods and computer program products for providing a seamless login experience in a companion mobile application. When a user launches a mobile app on his mobile computing device, a login handler of the mobile app can establish a proximity channel with a user computing device on which the user is logged into a desktop application for which the mobile app is a companion application. The login handler can send a mobile user ID to a login plugin on the user computing device. If the mobile user ID matches a user ID used to log the user into the desktop application, the login plugin can provide a token to the login handler. The login handler can then use the token to obtain a session token that can be used to log the user into the mobile app.

In some embodiments, the present invention may be implemented as a method for providing a seamless login experience in a companion mobile application. A proximity channel can be established between a mobile computing device and a user computing device. The user computing device includes a desktop application that a user is logged into, and the mobile computing device includes a mobile app that the user is not logged into. A login plugin on the user computing device can receive a mobile user ID from a login handler of the mobile app. The login plugin can determine that the mobile user ID matches a user ID used to log the user into the desktop application. The login plugin can send a token to the login handler. The login handler can use the token to obtain a session token for logging the user into the mobile app.

In some embodiments, the present invention may be implemented as computer storage media storing computer executable instructions which when executed implement a method for providing a seamless login experience in a companion mobile application. A proximity channel can be established between a mobile computing device and a user computing device. The user computing device includes a desktop application that a user is logged into, and the mobile computing device includes a mobile app that the user is not logged into. A login plugin on the user computing device can receive a mobile user ID from a login handler of the mobile app. The login plugin can determine that the mobile user ID matches a user ID used to log the user into the desktop application. The login plugin can send a token to the login handler. The login handler can use the token to obtain a session token for logging the user into the mobile app.

In some embodiments, the present invention may be implemented as computer storage media storing computer executable instructions which when executed implement a login plugin on a user computing device, a mobile app on a mobile computing device, and an authentication service on a management server. A login handler of the mobile app, the login plugin, and the authentication service can be configured to perform a method for providing a seamless login experience in the mobile app. In response to detecting that the mobile computing device is in proximity to the user computing device, the login handler can send a mobile user ID of a user to the login plugin. The login plugin can determine that the mobile user ID matches a user ID used to log into a desktop application for which the mobile app is a companion application. The login plugin can generate a token. The login plugin can send the token to the login handler. The login handler can send a request for a session token to the authentication service. The request includes the token. The login handler can receive the session token from the authentication service and use the session token to log the user into the mobile app.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
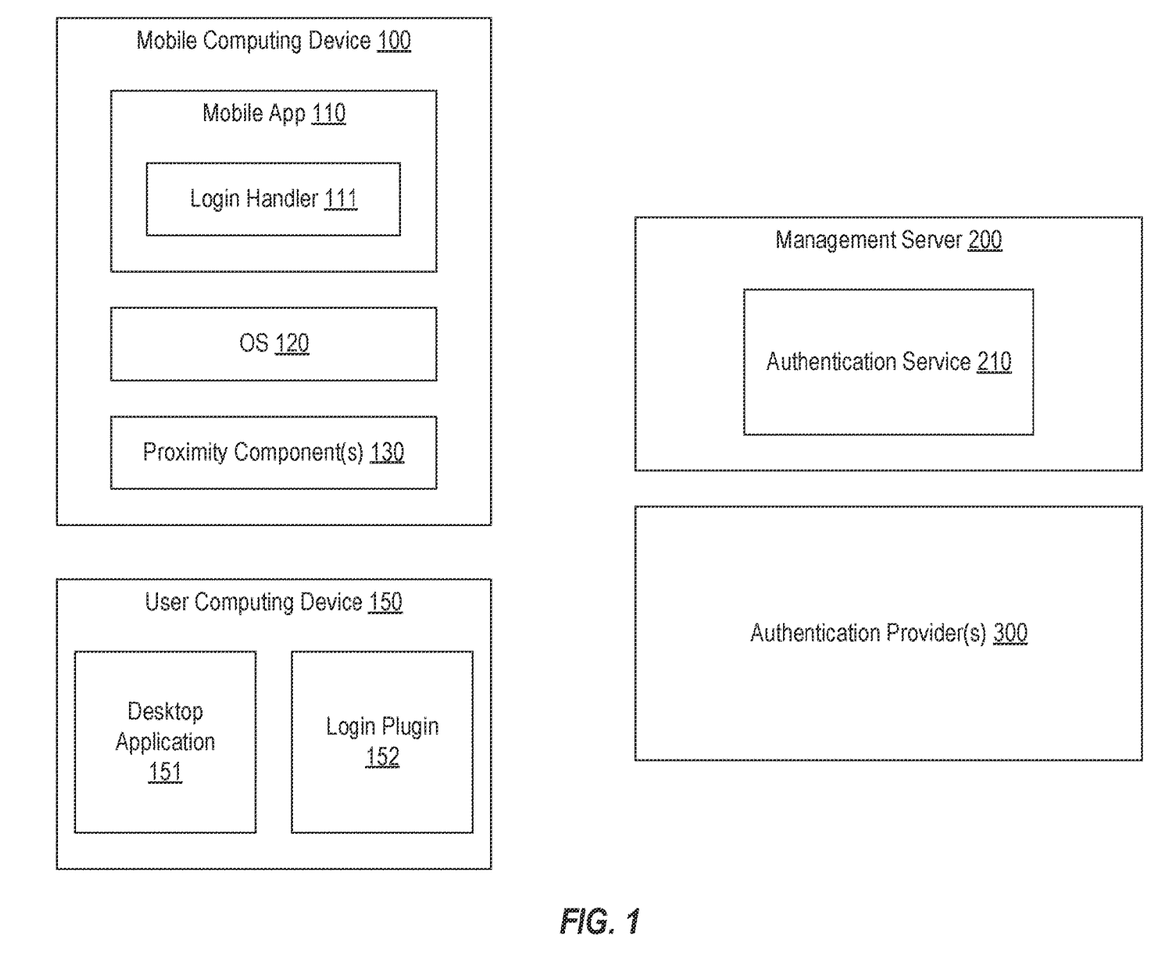
FIG. 1 provides an example of a computing environment in which embodiments of the present invention may be implemented.

FIG. 1 provides an example of a computing environment in which embodiments of the present invention may be implemented. This computing environment includes a mobile computing device 100 that can run a mobile app 110 such as a smart phone or tablet, a user computing device 150 that can run a desktop application such as a desktop or laptop, a management server 200 on which an authentication service 210 is hosted, and one or more authentication providers 300. Notably, there could be many other mobile computing devices 100 and user computing devices 150 that could rely on management server 200 as described herein.

Mobile computing device 100 can include an operating system (OS) 120 such as Android or iOS and can include one or more proximity components 130 such as NFC, Bluetooth, Airdrop (peer-to-peer Wi-Fi), etc. User computing device 150 would also include an operating system and proximity components but they are not shown to simplify the figures.

Management server 200 can represent any network accessible components such as a dedicated server computing device, a virtual machine, or cloud components. Authentication provider(s) 300 could represent Google Workspace, Azure Active Directory, Dell One Identity, or any other authentication provider.

Mobile app 110 is a companion application to desktop application 151. In other words, a user can log into either desktop application 151 or mobile app 110 to access the same account. As one example only, desktop application 151 could be the My Dell desktop application and mobile app 110 could be the My Dell mobile app, either of which the user could use to track an order, monitor a warranty status, or view other information regarding one or more Dell computing devices.

In accordance with embodiments of the present invention, a login handler 111 can be included in or otherwise associated with mobile app 110, and a login plugin 152 can be integrated with or otherwise provided for desktop application 151. As an overview, login handler 111, login plugin 152, and authentication service 210 can be configured to intercommunicate to provide a seamless login experience in mobile app 110 when a user is already logged into desktop application 151.

FIGS. 2A-2I provide an example of how a seamless login experience may be provided in a companion mobile application in accordance with embodiments of the present invention. This example is provided in the context of the computing environment of FIG. 1.

Figure 2A:
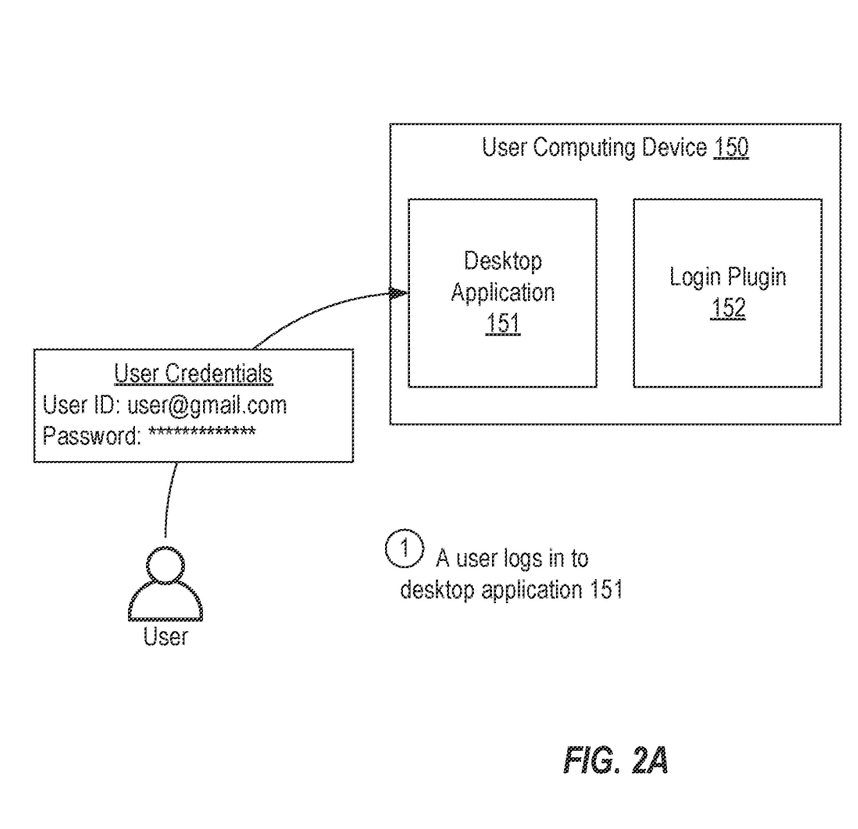
FIGS. 2A-2I provide an example of how a seamless login experience can be provided in a companion mobile application in accordance with embodiments of the present invention.

Turning to FIG. 2A, in step 1, it is assumed that a user logs into desktop application 151 on user computing device 150. The user is assumed to have established an account with user credentials that include a user ID of user@gmail.com.

Figure 2B:
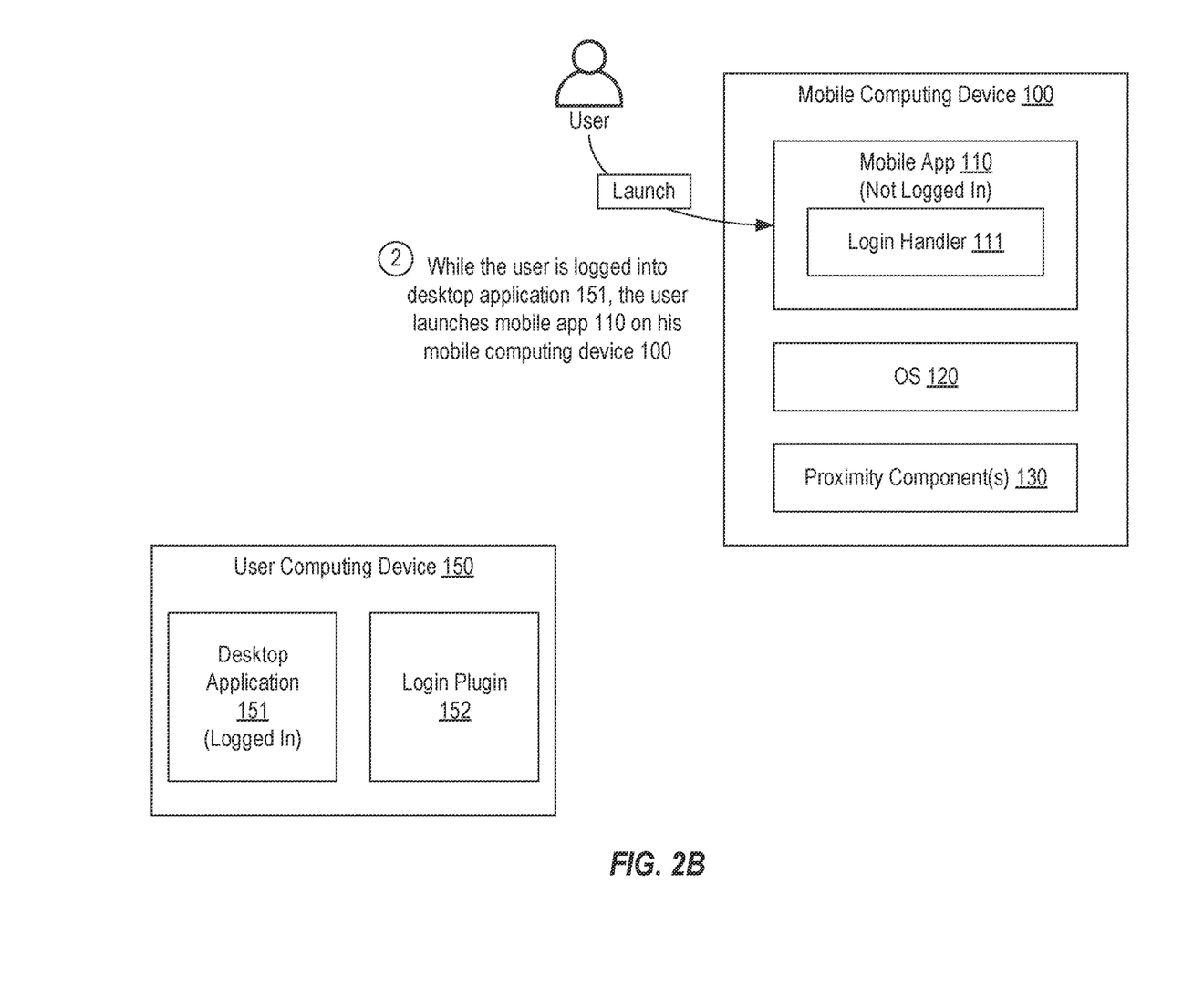

Turning to FIG. 2B, in step 2 which is performed while the user remains logged in to desktop application 151, the user launches mobile app 110 on his mobile computing device 100. As indicated, the user is not logged into mobile app 110 at this point.

Figure 2C:
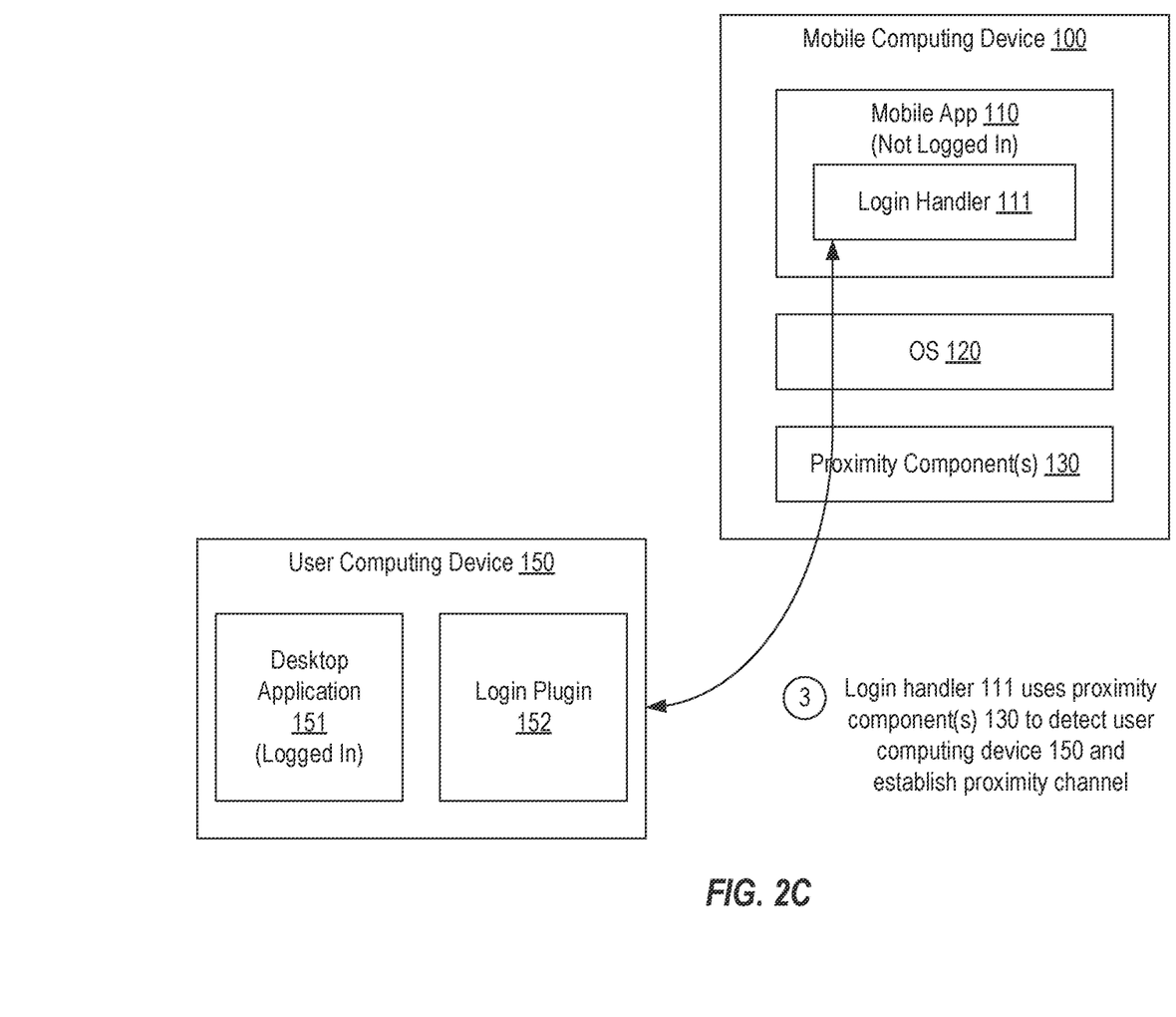

Turning to FIG. 2C, in step 3, login handler 111 can use proximity component(s) 130 to detect any nearby user computing devices, and upon detecting user computing device 150, login handler 111 can establish a proximity channel with user computing device 150 (e.g., an NFC-based channel, a Bluetooth-based channel, an Airdrop-based channel, etc.).

Figure 2D:
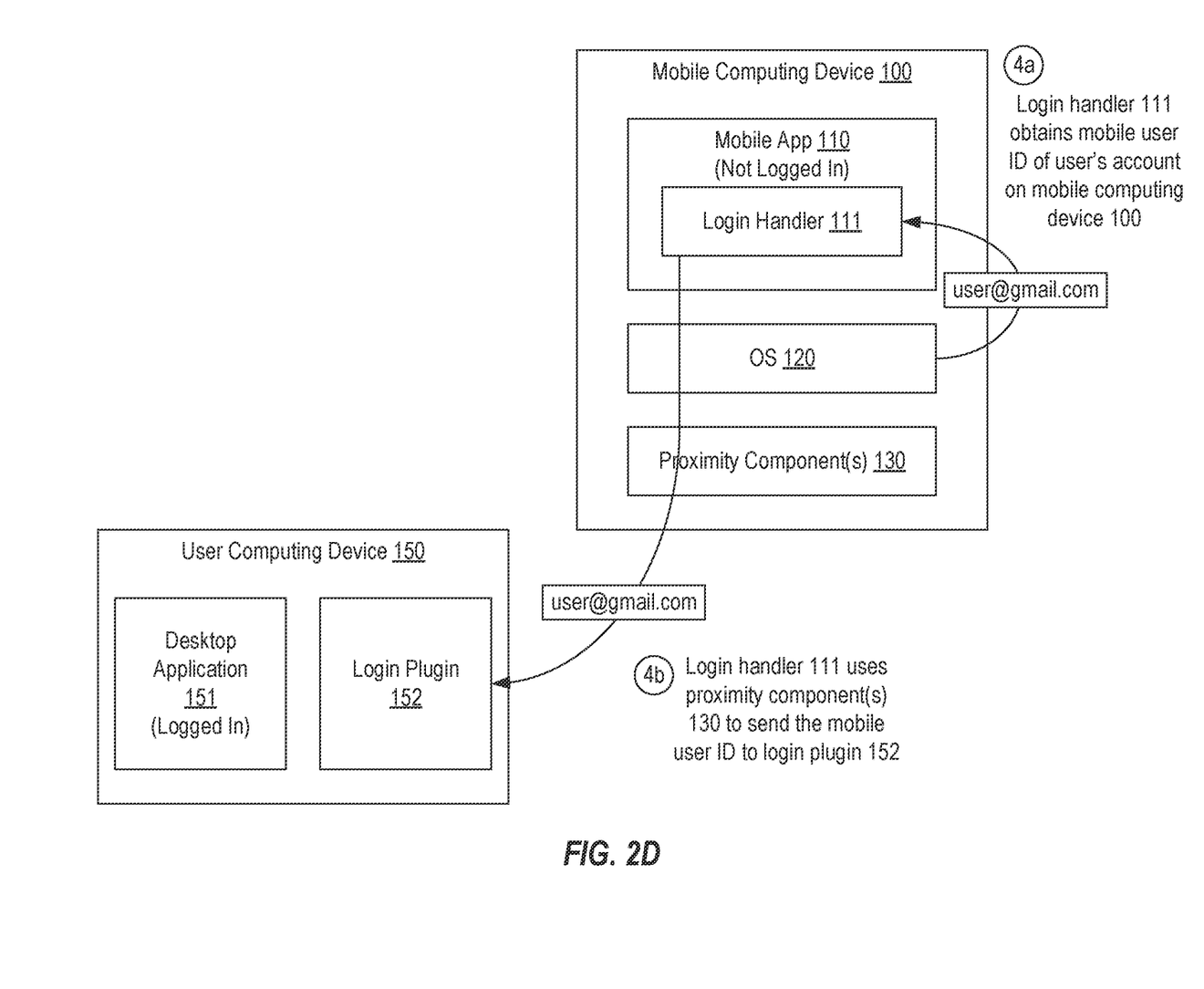

Turning to FIG. 2D, in step 4a, login handler 111 can obtain a mobile user ID of the user's account on mobile computing device 100. For example, login handler 111 could interface with OS 120 (or the AppStore or Google Play) to obtain the email address of the user's Apple ID on an iOS device or the user's Google account on an Android device. In this example, the mobile user ID is user@gmail.com. In step 4b, login handler 111 can send the mobile user ID to login plugin 152 via the proximity channel.

Figure 2E:
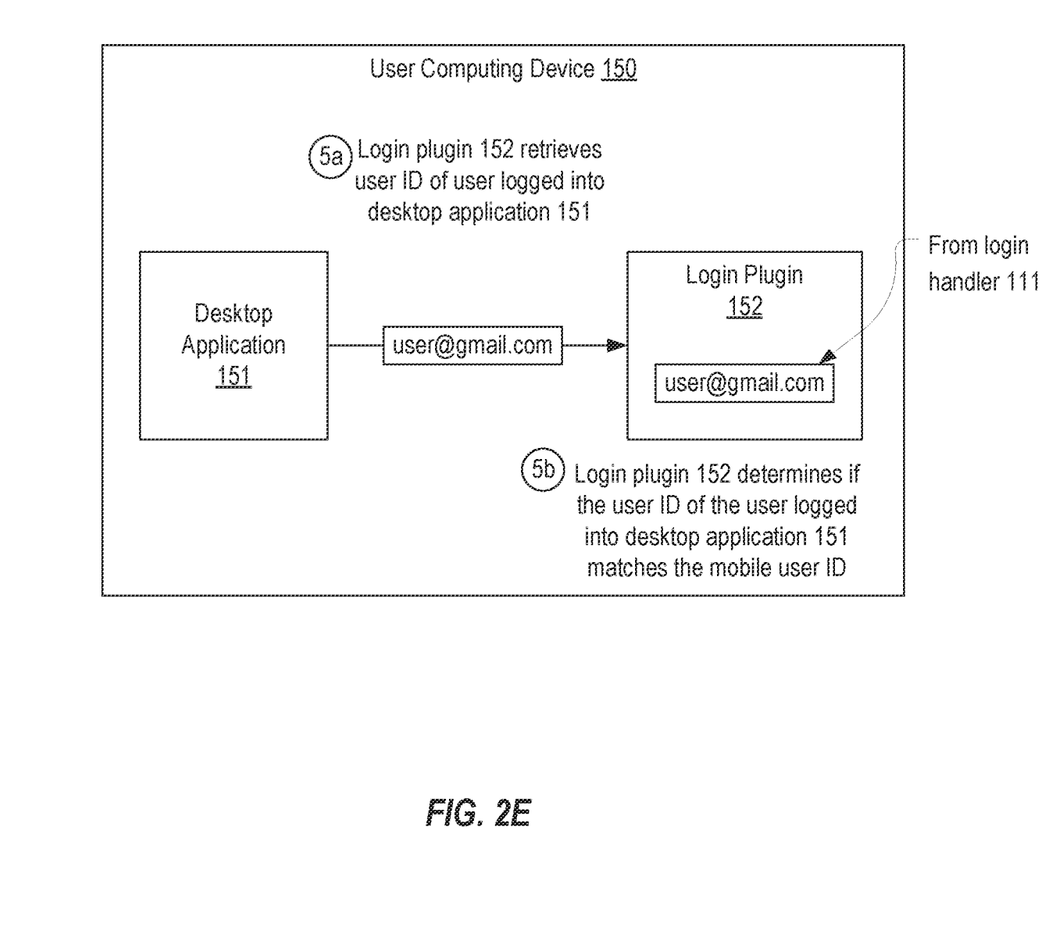

Turning to FIG. 2E, in step 5a and in response to receiving the mobile user ID from login handler 111, login plugin 152 can retrieve the user ID of the user that is logged in to desktop application 151. Based on the login that occurred in step 1, this user ID will be user@gmail.com. In step 5b, login plugin 152 can determine if the user ID of the user that is logged into desktop application 151 matches the mobile user ID that login plugin 152 received from login handler 111 via the proximity channel. In this example, login plugin 152 will determine that they match. In contrast, a login plugin 152 executing on another nearby user computing device that also received the mobile user ID from login handler 111 via a proximity channel could determine that the user ID of a different user logged into desktop application 151 on the other nearby user computing device does not match and could therefore ignore the mobile user ID.

Figure 2F:
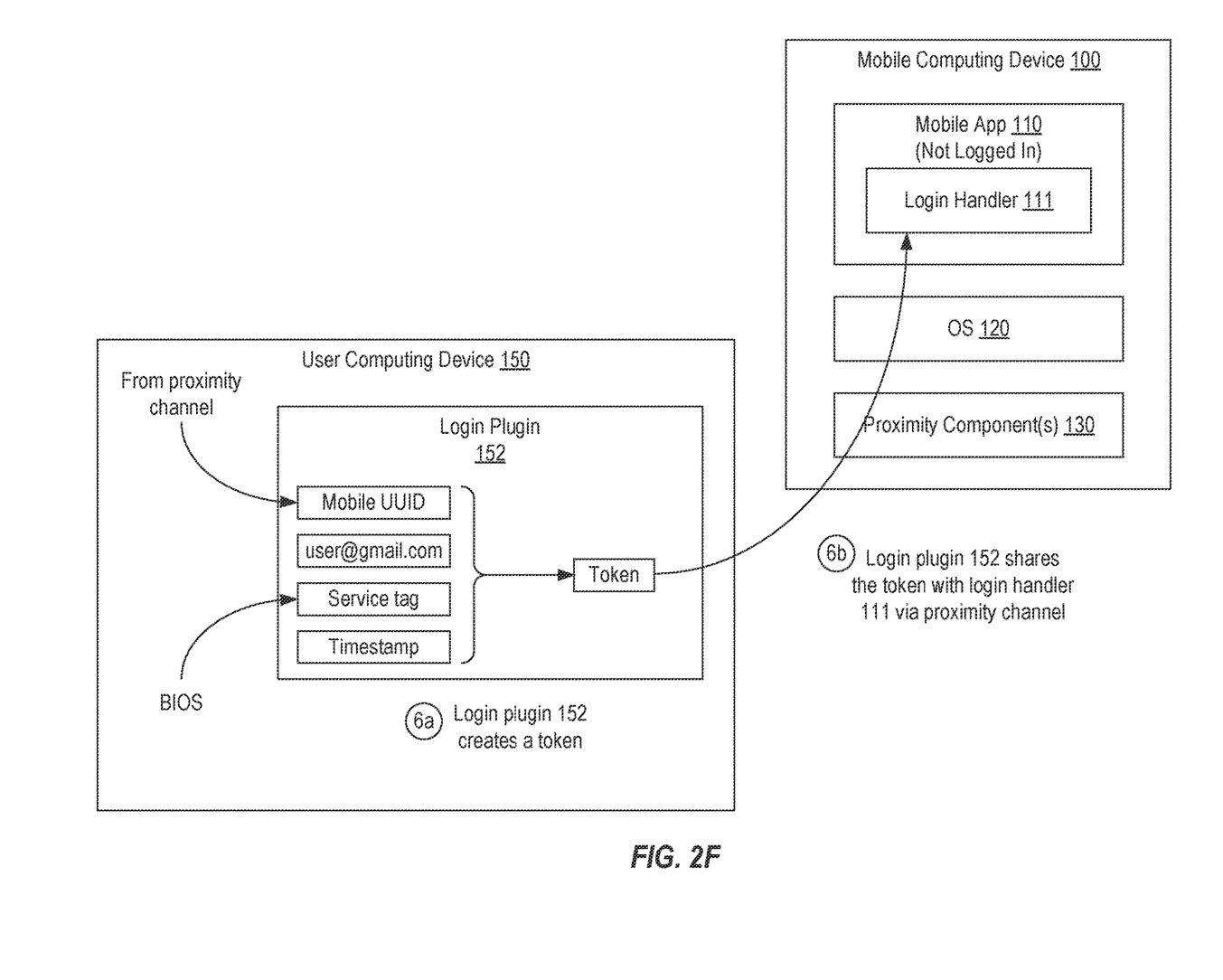

Turning to FIG. 2F, in step 6a and in response to determining that the mobile user ID matches the user ID of the user that is logged into desktop application 151, login plugin 152 can create a token. For example, this token could include a mobile universally unique identifier (mobile UUID) that unique identifies mobile computing device 100 (which login plugin 152 could obtain from login handler 111 via the proximity channel), the user ID/mobile user ID, a service tag of user computing device 150 (which login plugin 152 could obtain from the BIOS/UEFI), and a timestamp. In some embodiments, login plugin 152 could encrypt and/or sign this token to prevent modification. In step 6b, login plugin 152 can share the token with login handler 111 via the proximity channel.

Figure 2G:
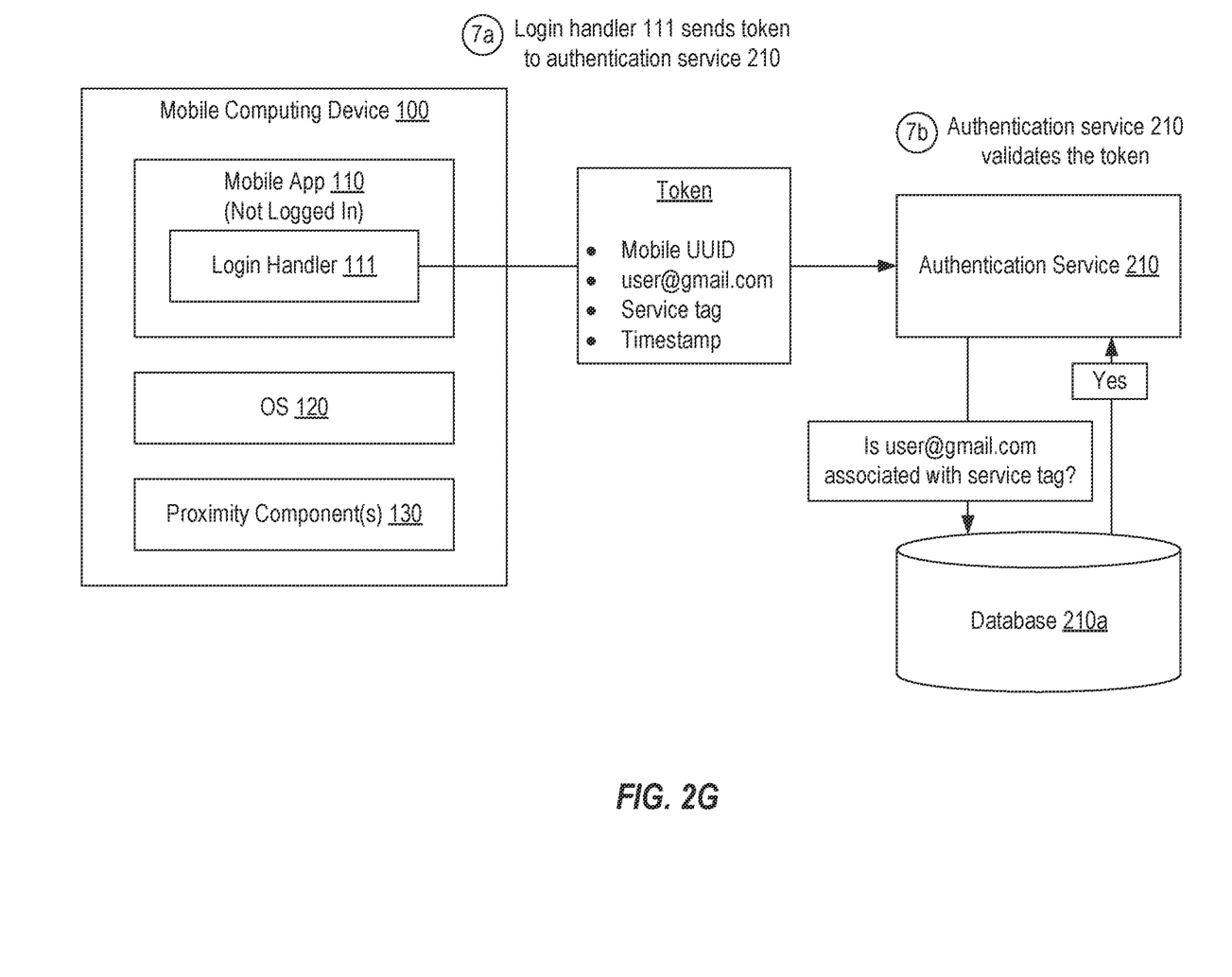

Turning to FIG. 2G, in step 7a, login handler 111 can send the token it received from login plugin 152 to authentication service 210. In step 7b, authentication service 210 can validate the token such as by querying a database 210a to determine if the user ID defined in the token is associated with the service tag defined in the token. Such may be the case when the user used his account with desktop application 151 to order, register, and/or to manage user computing device 150. In some embodiments, this validation could also include verifying that the token is not expired (e.g., via the timestamp).

Figure 2H:
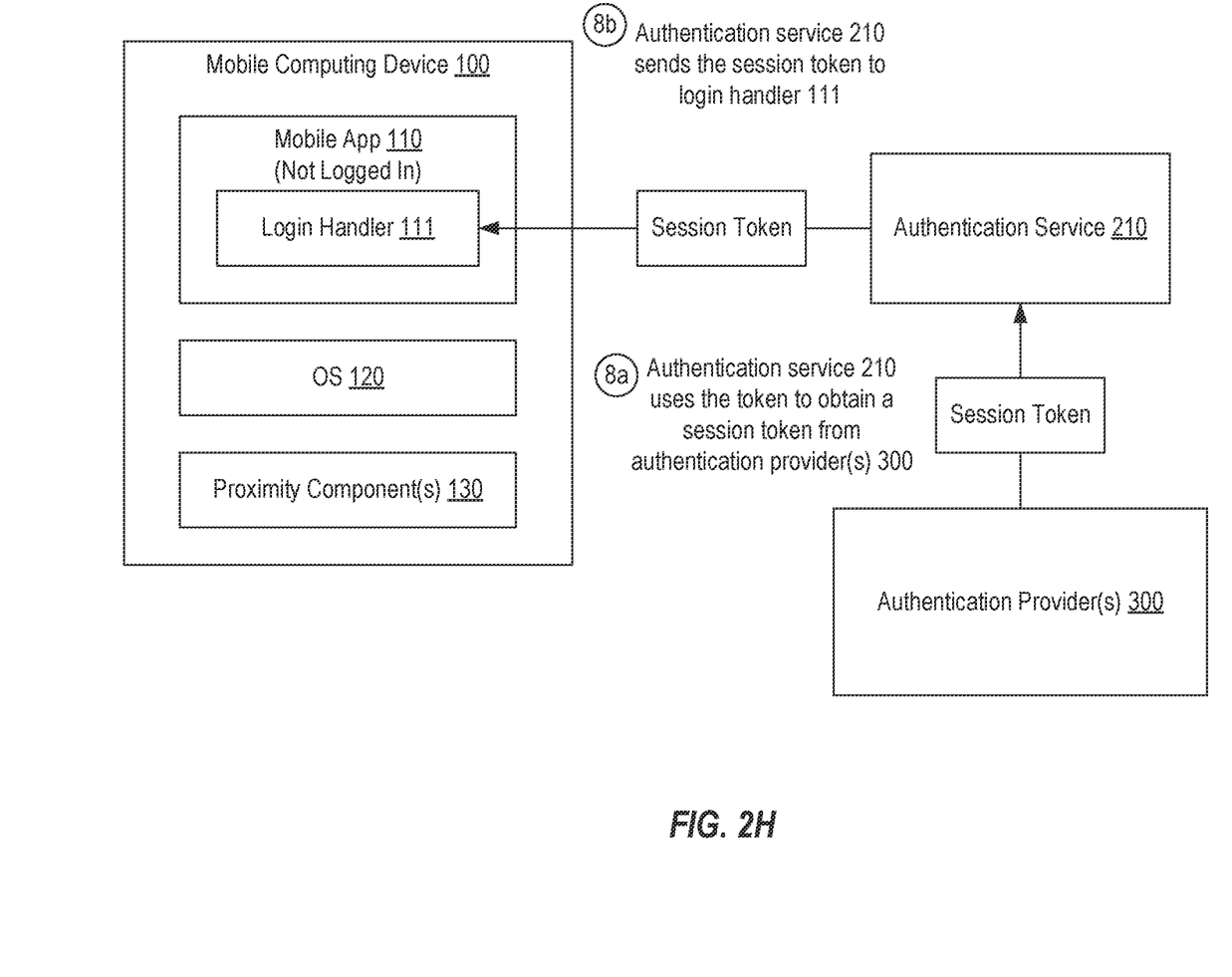

Turning to FIG. 2H, in step 8a and in response to validating the token, authentication service 210 can use the token to obtain a session token from one of authentication provider(s) 300. For example, authentication service 210 can use the user ID and mobile UUID to request and obtain the session token on behalf of the user for purposes of logging into mobile app 110 on mobile computing device 100. In step 8b, authentication service 210 can send the session token to login handler 111.

Figure 2I:
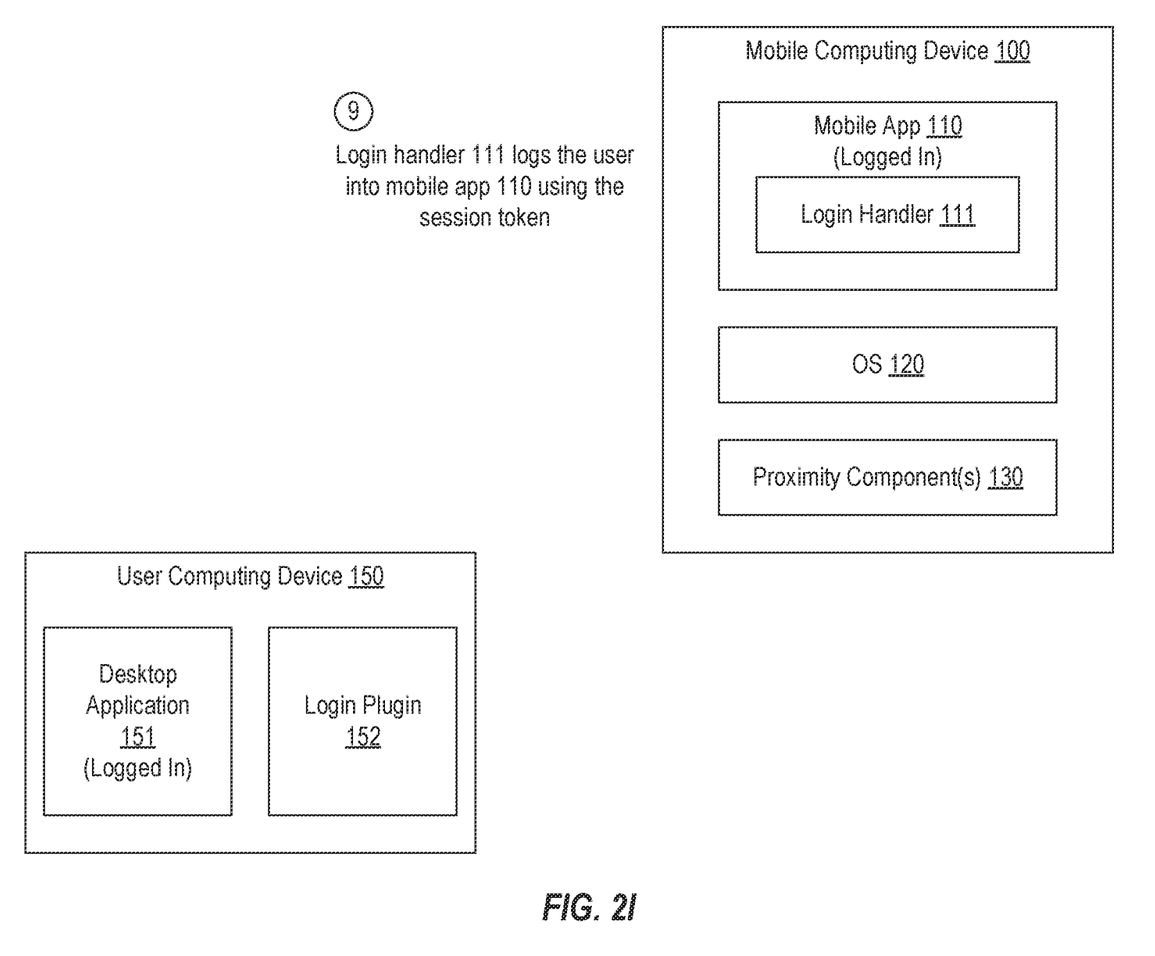

Finally, turning to FIG. 2I, in step 9, login handler 111 can log the user into mobile app 110 using the session token. In this way, the user is seamlessly logged into mobile app 110 by leveraging his logged in status with desktop application 151 and the proximity of mobile computing device 100 to user computing device 150.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing a seamless login experience in a companion mobile application, the method comprising:
    establishing a proximity channel between a mobile computing device and a user computing device, the user computing device including a desktop application that a user is logged into, the mobile computing device including a mobile app that the user is not logged into;
    receiving, at a login plugin on the user computing device, a mobile user ID from a login handler of the mobile app;
    determining, by the login plugin, that the mobile user ID matches a user ID used to log the user into the desktop application;
    sending, by the login plugin, a token to the login handler; and
    using, by the login handler, the token to obtain a session token for logging the user into the mobile app.

2. The method of claim 1, wherein the proximity channel is established using one of more of NFC, Bluetooth, or peer-to-peer Wi-Fi.

3. The method of claim 1, further comprising:
    obtaining, by the login handler, the mobile user ID from the mobile computing device.

4. The method of claim 3, wherein the mobile user ID is a user ID of an account of the user on the mobile computing device.

5. The method of claim 3, wherein the mobile user ID is an email address of an Apple ID or Google account of the user.

6. The method of claim 1, wherein the token includes the user ID.

7. The method of claim 6, wherein the token includes a service tag of the user computing device.

8. The method of claim 7, wherein the token includes a universally unique ID of the mobile computing device.

9. The method of claim 1, wherein the login handler sends the token to an authentication service to receive the session token.

10. The method of claim 9, wherein the authentication service uses the token to obtain the session token from an authentication provider.

11. One or more computer storage media storing computer executable instructions which when executed implement a method for providing a seamless login experience in a companion mobile application, the method comprising:
    establishing a proximity channel between a mobile computing device and a user computing device, the user computing device including a desktop application that a user is logged into, the mobile computing device including a mobile app that the user is not logged into;
    receiving, at a login plugin on the user computing device, a mobile user ID from a login handler of the mobile app;
    determining, by the login plugin, that the mobile user ID matches a user ID used to log the user into the desktop application;
    sending, by the login plugin, a token to the login handler; and
    using, by the login handler, the token to obtain a session token for logging the user into the mobile app.

12. The one or more computer storage media of claim 11, wherein the token includes a service tag of the user computing device.

13. The one or more computer storage media of claim 12, wherein the login handler provides the token to an authentication service to obtain the session token.

14. The one or more computer storage media of claim 13, wherein the authentication service validates the token by determining that the user ID is associated with the service tag.

15. The one or more computer storage media of claim 11, wherein the mobile user ID comprises an email address of the user's Apple ID or Google account.

16. One or more computer storage media storing computer executable instructions which when executed implement a login plugin on a user computing device, a mobile app on a mobile computing device, and an authentication service on a management server, wherein a login handler of the mobile app, the login plugin, and the authentication service are configured to perform a method for providing a seamless login experience in the mobile app, the method comprising:
    in response to detecting that the mobile computing device is in proximity to the user computing device, sending, by the login handler, a mobile user ID of a user to the login plugin;
    determining, by the login plugin, that the mobile user ID matches a user ID used to log into a desktop application for which the mobile app is a companion application;
    generating, by the login plugin, a token;
    sending, by the login plugin, the token to the login handler;
    submitting, by the login handler, a request for a session token to the authentication service, the request including the token;

receiving, by the login handler, the session token from the authentication service; and using, by the login handler, the session token to log the user into the mobile app.

17. The one or more computer storage media of claim 16, wherein the token includes the user ID and a service tag of the user computing device.

18. The one or more computer storage media of claim 17, wherein the authentication service validates the token by determining that the user ID is associated with the service tag.

19. The one or more computer storage media of claim 16, wherein the login handler sends the mobile user ID via a proximity channel.

20. The one or more computer storage media of claim 16, wherein the mobile user ID is an email address of the user's Apple ID or Google account on the mobile computing device.

* * * * *